United States Patent [19]

Yearsley

[11] E Patent Number: Re. 33,636

[45] Reissued Date of Patent: Jul. 16, 1991

[54] ARTICLE AND METHOD FOR ENCLOSING AND PROTECTING ENTOMBMENT CASKETS

[76] Inventor: David A. Yearsley, 2208 Delaware Ave., Pittsburgh, Pa. 15218

[21] Appl. No.: 482,032

[22] Filed: Feb. 20, 1990

Related U.S. Patent Documents

Reissue of:

[64] Patent No.: 4,727,632
Issued: Mar. 1, 1988
Appl. No.: 894,001
Filed: Aug. 7, 1986

[51] Int. Cl.[5] ..... A61G 17/00; E04H 13/00

[52] U.S. Cl. ..... 27/35; 27/7; 52/134; 52/139

[58] Field of Search ..... 27/35, 7, 27, 2, 8, 27/1, 28, 22 R, 23; 52/129, 134, 139, 140, 141, 133; D99/1, 3, 4, 15

[56] References Cited

U.S. PATENT DOCUMENTS

| | | | |
|---|---|---|---|
| Re. 29,532 | 2/1978 | Zwick | 52/140 |
| 69,596 | 10/1867 | Van Houten | 27/11 |
| 188,014 | 3/1877 | Holmes | 27/11 |
| 520,098 | 5/1894 | Warner | 211/71 |
| 692,067 | 1/1902 | Okey | 52/133 X |
| 1,014,614 | 1/1912 | Clair | 52/140 |
| 2,783,523 | 3/1957 | Halley | 27/35 |
| 2,815,130 | 12/1957 | Franks | 211/148 |
| 2,835,955 | 5/1958 | Snyder | 27/35 |
| 3,208,186 | 9/1965 | Fulton | 27/35 X |
| 3,295,179 | 1/1967 | Behrendt | 27/35 |
| 3,529,730 | 9/1970 | Thompson | 211/71 |
| 3,613,189 | 10/1971 | Kirby | 27/35 |
| 3,681,820 | 8/1972 | Jalbert | 27/7 |
| 3,868,799 | 3/1975 | Hayward | 27/35 |
| 3,898,718 | 8/1975 | Eubank | 27/7 X |
| 3,945,094 | 3/1976 | Daran | 52/134 |
| 3,964,140 | 6/1976 | Gauchard | 27/35 |
| 4,074,811 | 2/1978 | Filak | 211/191 |
| 4,142,637 | 3/1979 | Kraiss | 52/122 |
| 4,154,031 | 5/1979 | Williamson | 27/35 |
| 4,253,220 | 3/1981 | Work | 27/7 |
| 4,328,606 | 5/1982 | Numes | 27/35 |
| 4,351,091 | 9/1982 | Goodkin | 27/22 R |
| 4,463,484 | 8/1984 | Arizpe | 27/2 |
| 4,669,157 | 6/1987 | Schwarten | 27/7 |

FOREIGN PATENT DOCUMENTS

| | | | |
|---|---|---|---|
| 219008 | 11/1958 | Australia | 211/191 |

*Primary Examiner*—Richard J. Johnson
*Attorney, Agent, or Firm*—Clifford A. Poff

[57] ABSTRACT

To overcome problems concerning storage of entombment caskets in crypts or mausoleums, particularly garden crypts, there is provided an air-tight end-capped casket-enclosing article made of suitable material, such as rotation-molded polyethylene or other suitable synthetic resinous (plastic) material, alone or reinforced with suitable other fibrous material, such as fiberglass. *A check valve vents the air-tight space enclosed by the casket-enclosing article.*

11 Claims, 2 Drawing Sheets

ARTICLE AND METHOD FOR ENCLOSING AND PROTECTING ENTOMBMENT CASKETS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the art of mortuary science, and in particular, it is concerned with a novel article and the method of its use in connection with enclosing and protecting entombment caskets in a crypt or mausoleum, particularly in a garden crypt.

2. Description of the Prior Art

It is well known, in mortuary science, to provide, for enclosing a casket, a burial vault which is made of two pieces of "synthetic plastic resinous material" which are fitted together to provide an air-tight seal. Such an article, together with a practice for its use, is disclosed, for example, in any of the U.S. Pat. Nos. 3,208,188, 3,208,186; and 4,154,031. The prior art contains a burial vault made of fiberglass, as shown in U.S. Pat. No. 3,172,183; and it contains a burial vault made of polyethylene or other molded plastic material, as in the above-mentioned U.S. Pat. No. 4,154,031.

In the prior art as exemplified by the abovementioned patents, the burial vaults have invariably been of a two-piece construction comprising a base and a dome-shaped lid, and these articles have also been intended for use in underground burial, replacing massive concrete structures which were at one time used in order to provide the necessary load-bearing characteristics which are important in connection with such burial.

In the prior art, there has been, prior to the present invention, less of an appreciated need for providing a further air-tight enclosure around the casket in the case of having the casket protected in a crypt or mausoleum. Experience with the maintenance of garden crypts and mausoleums has revealed, however, that there may be, in the practice of this method of the long-term protection of remains, as much of a need, if not more of a need, for the use of an additional air-tight sealing structure around the casket, regardless of whether the casket itself is of a sealing or a non-sealing type. Persons charged with the maintenance of the mausoleums and crypts are well aware of the necessity of providing ventilation means for the crypts, and of spending money on various means which are used to mask or suppress odors or to control insects and other pests.

The prior art has not provided, for this use, any especially suitable article of manufacture. More particularly, it has not provided an article in the form of an end-capped enclosure, nor has there been taught the method of overcoming the above-indicated problems by the use of such an article.

SUMMARY OF THE INVENTION

To overcome problems concerning storage of entombment caskets in crypts or mausoleums, particularly garden crypts, there is provided an air-tight end-capped casket-enclosing article made of suitable material, such as rotation-molded polyethylene or other suitable synthetic resinous (plastic) material, alone or reinforced with suitable other fibrous material, such as fiberglass.

DESCRIPTION OF THE DRAWINGS

A complete understanding of the invention may be obtained from the foregoing and following description thereof, taken in conjunction with the appended drawings, in which.

DESCRIPTION OF THE PREFERRED EMBODIMENTS

Figure 1:
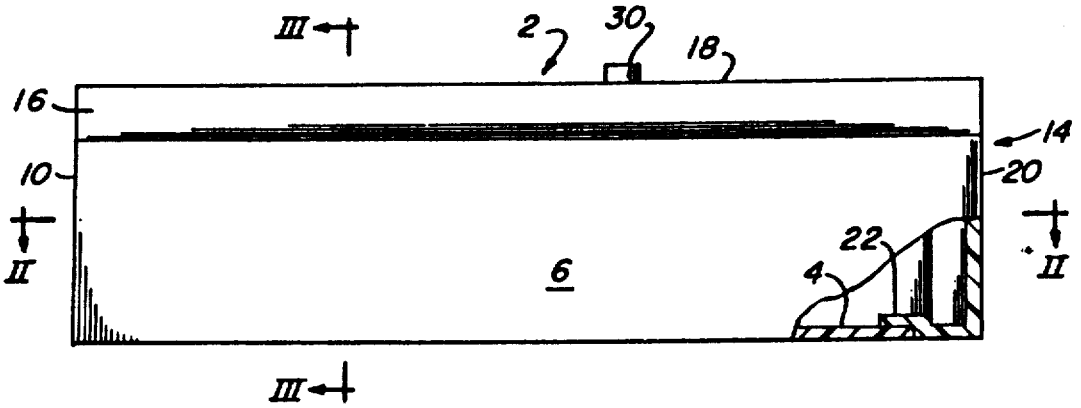
FIG. 1 is a side elevation view of a casket enclosure used in accordance with the invention, partly broken away to reveal interior details.
Figure 2:
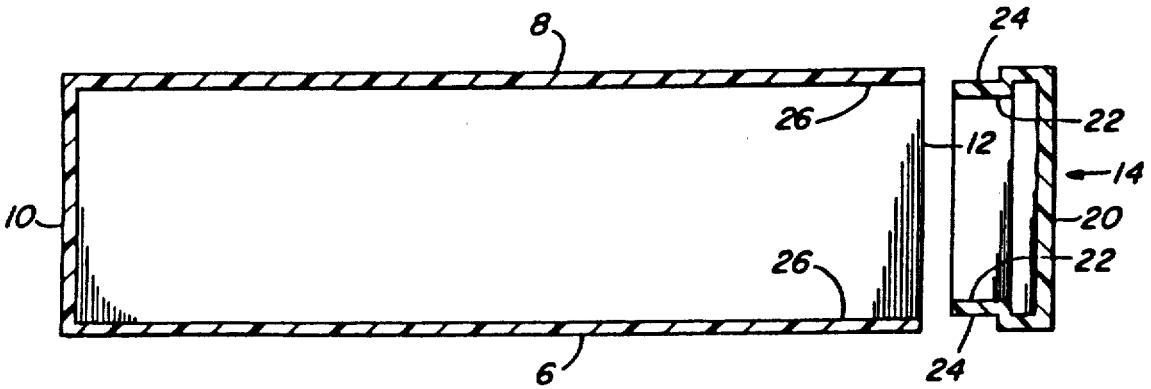
FIG. 2 is a sectional view, taken on the line II—II of FIG. 1, but exploded to show separately the body and the end-cap parts which comprise a casket enclosure used in accordance with the invention.
Figure 3:
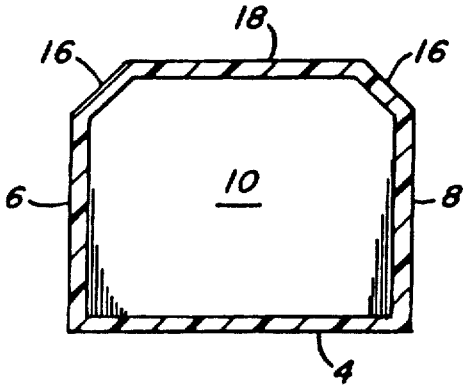
FIG. 3 is a sectional elevation view taken on the line III—III of FIG. 1; [and]
Figure 4:
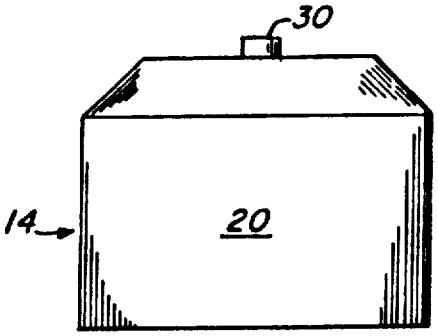
FIG. 4 is an end elevation view of the cap member shown in FIG. 2[.]; *and*

There is depicted in FIG. 1 a side elevation view of a casket enclosure 2 which is a novel article of manufacture, for use in accordance with the method of the present invention. As can be seen from the drawings, the casket enclosure 2 is a hollow, elongated article having a bottom 4, side walls 6 and 8, a wall 10 at its closed end, and an open end 12 which is adapted to be closed by means of a cap member 14.

The body member of the casket enclosure 2 also preferably has, adjacent to the tops of its side walls 6 and 8, some suitable portions 16 which are of diminishing horizontal dimensions as one approaches the top surface 18 of the casket enclosure 2. The portions 16 may, as shown, be planar, and as those skilled in the art will readily appreciate, surfaces which are radially curved or otherwise similarly shaped may likewise be used.

With the body member of the casket enclosure 2, there is used an end-cap member 14 which has a suitable exterior surface 20, as well as having, on the side thereof which is opposite to the exterior surface 20, the suitable, relatively thin-walled parts 22 which are adapted to form, through their surfaces 24, a suitable permanent air-tight and water-proof seal with the surfaces 26 upon the interior of the body member of the casket enclosure 2 in the vicinity of its open end.

Those skilled in the art will appreciate that a suitable seal can be effected in any of several suitable known ways, i.e., with the use of any of a variety of suitable sealing materials which may be applied to such surfaces, such as silicon glaze or epoxy cement. Sealing by the action of an electric welder which heats to form by fusion a unitary structure is another possibility. The intent is, in any event, to form a casket enclosure 2 which will be completely air-tight and water-proof and remain so for at least fifty years.

The casket-enclosure article which is used in accordance with the present invention has suitable exterior dimensions to enable it to be fitted into an appropriate place in a crypt or mausoleum, on the one hand, and suitable interior dimensions to be able to receive within its interior a casket, on the other. Thus, in general, a casket-enclosure article which is used in accordance with the invention has an overall length which is on the order of 85½ inches or 87½ inches, and an exterior overall width which is on the order of 30 inches or 32 inches, and an overall exterior height which is on the order of 25 inches or 26 inches. The width of the top is on the order of 2½ to 7 inches less than the width of the bottom, and the casket-enclosure article preferably has, throughout, a wall thickness on the order of at least 3/16 inch or more. Such articles can be made so that they have an overall weight on the order of 70 to 120 pounds.

In accordance with a preferred embodiment of the invention, a casket-enclosure article as described above is made of polyethylene which is black in color, the article being formed in accordance with a process, known per se, wherein the powder or polymer to be molded is placed within a suitable mold and heated to a suitable temperature while simultaneously being rotated about two perpendicular axes simultaneously to effect the centrifugal casting of an article of the desired shape and dimensions. Both the body member and the cap member may be so made. Making the article in this way is desirable because it tends to afford additional material at some places, like corners, where additional material would be more desirable, and at the same time, such a process, in contrast to the use of injection molding, forms the articles without the introduction of stresses thereinto, which is desirable from the standpoint of obtaining an article more likely to withstand exceedingly prolonged storage without the development of any stress-related cracking.

Figure 5:
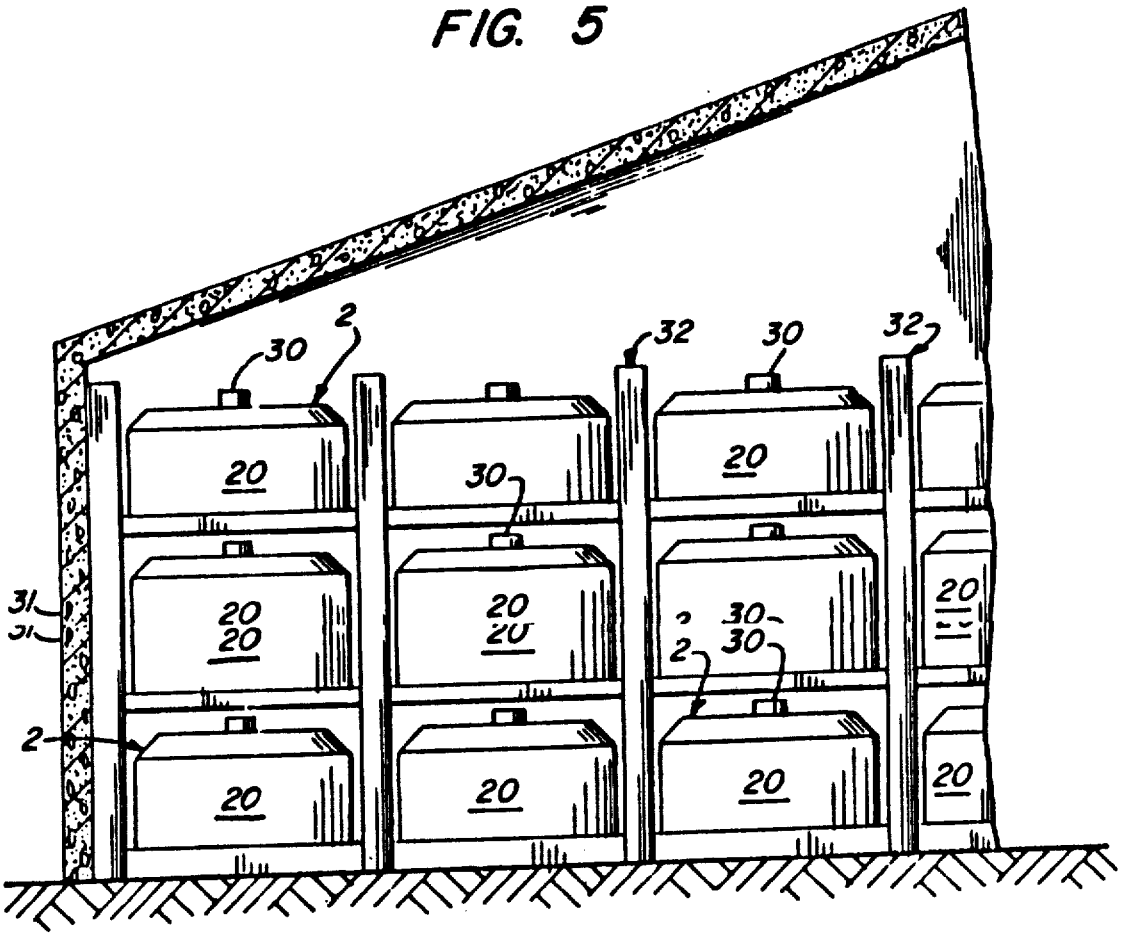
*FIG. 5 is an elevational view illustrating entombment caskets of the present invention in an above-ground building.*

Those skilled in the art will require no further instruction about how such an article would be used, in connection with the in-garden-crypt or in-mausoleum long-time storage of a casket, sealed or unsealed. The casket is inserted into the body of the casket enclosure and then the cap-end is applied, to form a suitably air-tight unitary whole. *The sealed enclosure 2 containing a casket can then be stored in an above ground building 31 as typically illustrated in FIG. 5. Storage racks 32 are suitably arranged in the building to receive and provide long term support sites for the sealed enclosures 2.*

Those skilled in the art will also appreciate the advantages that are obtained by the use of such a structure in connection with mausoleums and garden crypts, and in particular, they will appreciate that it will be possible to obtain a comparatively long life, affording an article which resists corrosion, and does not rust or rot or warp, and is not affected by extreme changes in temperature. It affords permanence, and it creates an air-tight and water-proof construction, which makes unnecessary some expenses that have otherwise been incurred in connection with maintaining an above-ground entombment, such as the use of fogs, aerosols, dusting or spraying with insecticide or other pesticide material, and it eliminates or greatly reduces the use of fumigants and/or perfumants to control odors, as well as eliminating or greatly reducing the need for purchasing and using an electrocutor-type light trap for the control of insects and pests. The expense and the use of an inner crypt seal, or the use of caulking to seal and re-seal the crypt can be avoided, as well as the need to spread embalming powder in each crypt. The labor time required to seal or re-seal a crypt is reduced when the article and the method according to the present invention are used. Use of the invention affords a reduction in utility costs for ventilation, heating, and air-conditioning in the maintenance in the above-ground entombments. There may also be advantages obtained in respect to reducing the cost of the crypt, because of a decreased need for providing ventilation means.

Those skilled in the art will appreciate the potential usefulness of the invention in its enabling the design and construction of a novel kind of garden crypt or mausoleum, one in which, instead of its being necessary to provide, for each crypt enclosure, concrete in relatively great amounts, there is instead provided a structure which is lighter in weight and more compact, with a solid or honeycomb steel shelving support for each casket after applying a protective enclosure according to the present invention. The casket enclosure according to the invention will serve to diminish or exclude the chance that such shelving support will be subjected to conditions which may cause it to rust.

Optionally, moreover, there may also be provided, at any desired or suitable location, whether in the cap or the body of the article disclosed herein, a pressure-relief valve 30. Desirably, this valve has an exterior port which is connected to a ventilation pipe which communicates via suitable tubing with the exterior of the mausoleum or garden crypt.

While I have shown and described herein certain embodiments of my invention, I intend to cover as well any change or modification therein which may be made without departing from its spirit and scope.

I claim:

[1. The method of providing long-term storage of an entombment casket in an above ground building which method comprises encasing said casket in a thin-walled enclosure means which is made of synthetic resinous material and is of two-part construction, said enclosure means comprising a unitary body member which envelopes said casket and an end-cap member, permanently joining, in an air-tight and water-proof manner, said body member after said casket has been inserted therein, and said end cap member, and venting the space enclosed by said enclosure means while supported at a desired location in said above ground building.]

[2. A method as defined in claim 1, wherein said synthetic resinous material is a polyethylene which is black in color, and said enclosure means has a wall thickness of approximately 3/16 inch or more, and an overall weight on the order of 70 to 120 pounds.]

[3. A method as defined in claim 1, wherein after said casket is encased in said enclosure means, the enclosure means containing the casket is given long-term storage in said above ground building without the use of agents selected from the group consisting of fumigants, perfumants, and pesticides.]

[4. A method as defined in claim 3, wherein said synthetic resinous material is a polyethylene which is black in color, and said enclosure means has a wall thickness of approximately 3/16 inch or more, and an overall weight on the order of 70 to 120 pounds.]

[5. The method according to claim 1 wherein said means for venting include a pressure relief valve.]

[6. The method according to claim 1 wherein said means for sealing include fusing said unitary body member to said end cap member by heat welding.]

[7. The method according to claim 1 wherein said sealing includes joining said unitary body member to said end cap by sealing material.]

[8. The method according to claim 1 wherein said above ground building is a mausoleum.]

*9. An article for providing long-term storage of an entombment casket comprising:*

*a casket enclosure means which is made of synthetic resinous material and is of a two-part construction, the two-part construction of said enclosure means comprising a unitary body member which envelops said casket and an end cap member;*

*means for permanently sealing said body member and said end cap member in air-tight and water-proof manner after said casket has been inserted therein; and*

*means including a pressure relief valve for venting the space enclosed by said enclosure means.*

*10. The article as defined in claim 9, wherein said synthetic resinous material is a polyethylene and said enclosure means has a wall thickness of approximately 3/16 inch or more, and an overall weight on the order of 70 to 120 pounds.*

*11. The article as defined in claim 9, wherein said means for sealing include fusing said unitary body member to said end cap by heat welding.*

*12. The article as defined in claim 9, wherein said means for sealing include sealing material for joining said unitary body member to said end cap.*

*13. A system for providing long-term storage of an entombment casket in an above ground building comprising;*

*a casket enclosure means which is made of synthetic resinous material and is of a two-part construction, the two-part construction of said enclosure means comprising a unitary body member which envelops said casket and an end cap member;*

*means for permanently sealing said body member and said end cap member in air-tight and water-proof manner after said casket has been inserted therein;*

*means for venting the space enclosed by said enclosure means; and*

*rack means in said above ground building for receiving and supporting said enclosed caskets for long-term storage in said above ground building.*

*14. The system as defined in claim 13, wherein said above ground building is a mausoleum.*

*15. A method of providing long-term storage of an entombment casket in an above ground building, said method comprising the steps of:*

*(a) selecting a thin-walled enclosure means made of synthetic resinous material, said enclosure means being of a two-part construction comprising a unitary body member which envelops said casket and an end cap member; thereafter,*

*(b) inserting said casket in said body member; thereafter*

*(c) permanently joining said body member and said end cap member in an air tight and water-proof manner; and*

*(d) venting the space enclosed by said enclosure means with a pressure relief valve while said enclosure means is supported at a desired location in said above ground building.*

*16. The method of claim 15 wherein said synthetic resinous material is a polyethylene and step (a) comprises selecting an enclosure means having a wall thickness of at least 3/16 inch and an overall weight on the order of 70 to 120 pounds.*

*17. The method of claim 15 wherein step (c) comprises joining said end cap member to said body member by heat welding.*

*18. The method of claim 15 wherein step (c) comprises joining said end cap member to said body member by sealing material.*

*19. The method of claim 15 wherein said above ground building is a mausoleum.*

* * * * *